United States Patent [19]

Wu et al.

[11] 4,075,461
[45] Feb. 21, 1978

[54] UPC SYMBOL DECODING SYSTEM

[75] Inventors: Paul S. Wu, Randolph; Robert V. Reago, N. Plainfield, both of N.J.

[73] Assignee: Litton Business Systems, Inc., Pine Brook, N.J.

[21] Appl. No.: 682,246

[22] Filed: May 3, 1976

[51] Int. Cl.² ............................................. G06K 7/14
[52] U.S. Cl. ..................................... 235/466; 235/431
[58] Field of Search .................. 235/61.11 E, 61.7 B, 235/61.11 D, 61.11 R, 61.12 M, 61.12 N; 340/146.3 K, 173 LT, 149 A; 250/568, 569

[56] References Cited

U.S. PATENT DOCUMENTS

| 3,723,710 | 3/1973 | Crouse ........................... 235/61.11 E |
| 3,886,521 | 5/1975 | Dobras ........................... 235/61.11 E |
| 3,891,831 | 6/1975 | Coles .............................. 235/61.11 E |
| 3,916,154 | 10/1975 | Hare ................................ 235/61.11 E |

*Primary Examiner*—Robert M. Kilgore
*Attorney, Agent, or Firm*—Norman Friedman; Robert F. Rotella

[57] ABSTRACT

A symbol decoding system for decoding symbols comprised of plurality of bars some of which representing characters, comprising, means for providing a series of pulses representative of said bars, means for counting the interval between positive transitions between adjacent pulses, means for counting the interval between negative transitions between adjacent pulses, means for storing said counted intervals, means for testing for certain predetermined relationships among said counted intervals, and means identifying particular characters whenever said predetermined relationships are satisfied.

9 Claims, 2 Drawing Figures

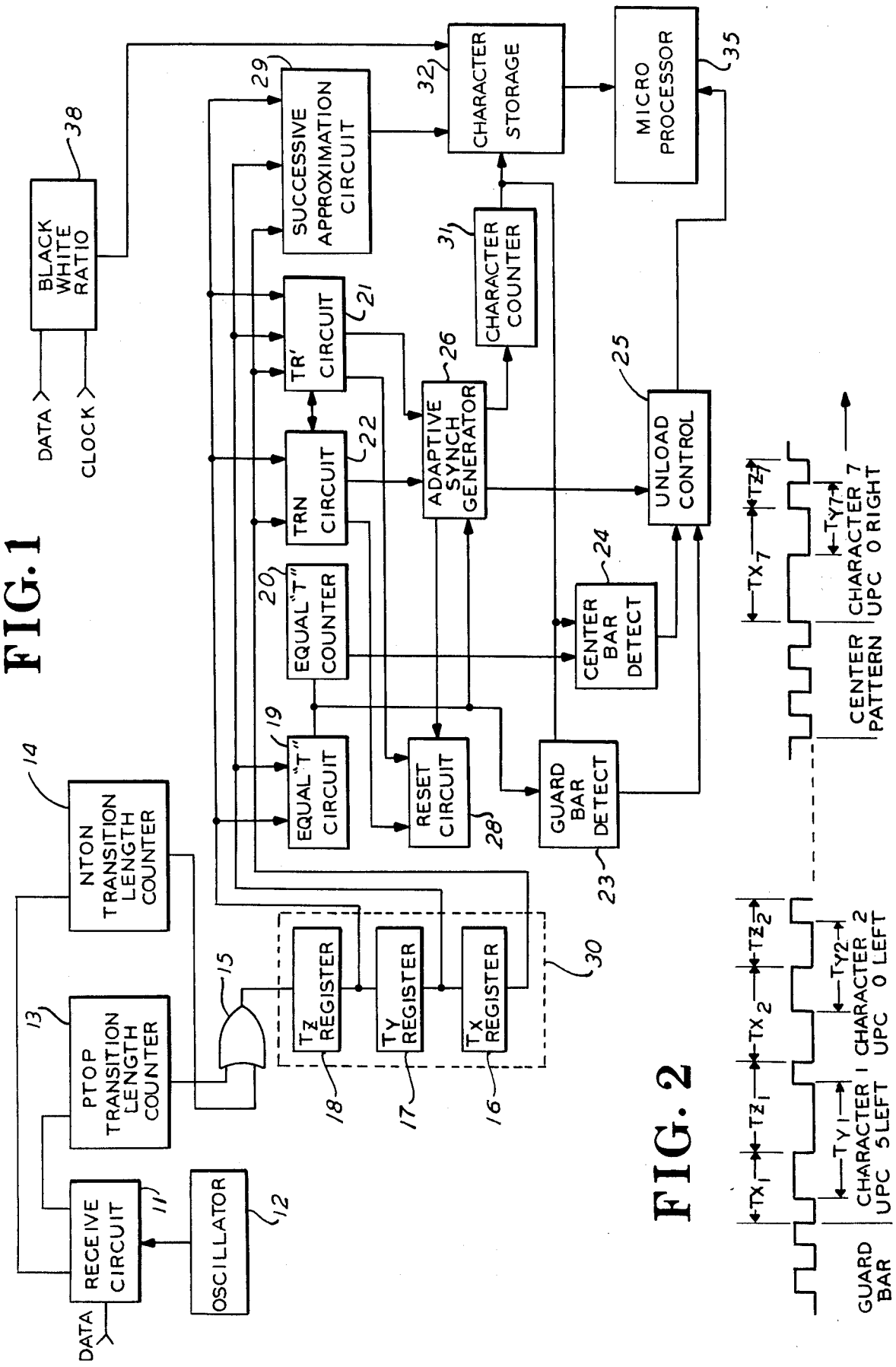

UPC SYMBOL DECODING SYSTEM

BACKGROUND OF THE INVENTION

The present invention is directed to a system for decoding information in the form of characters in a bar code.

Lately, the use of bar codes intended to be read by optical scanning equipment has become universal in such application as the retail grocery industry. One particular form of bar code known as the Universal Product Code (UPC) now appears on many products sold in grocery stores.

Briefly described, the UPC symbol consists of a series of light and dark parallel bars in a rectangular format. The left side of the symbol includes a guard bar followed by several characters of the UPC code and a center bar. To the right of the center bar are several more characters of the UPC code and another guard bar.

Each character is composed of seven data elements termed modules and the center bar pattern consists of a fixed pattern of light and dark bars.

Additional details of the UPC code may be obtained from "UPC Symbol Specification", May 1973, published by Distribution Number Bank, 1725 K Street, N.W., Washington, D.C. 20006 and which is hereby incorporated by reference.

OBJECTS AND SUMMARY OF THE INVENTION

The present invention provides a method for achieving decoding of a bar code such as the UPC symbol on a real time basis thereby eliminating the need for large storage memories and the attendant long times required for deriving the relationships necessary for decoding.

The sensed pulse train is measured for the transitions it contains and data representing the amount of time or length between the transitions is stored in three registers. The remaining networks test for certain relationships based on the transition information and perform decoding when the conditions are satisfied, while the registers contain the data. Each subsequent transition updates the data in the registers followed by condition testing and decoding, if possible.

BRIEF DESCRIPTION OF THE DRAWINGS

FIG. 1 is a block diagram schematic of the UPC symbol decoding system according to the invention; and FIG. 2 is a diagram showing a waveform derived from a typical UPC symbol.

DETAILED DESCRIPTION OF THE INVENTION

Data in the form of a digital pulse train representative of the black and white bars which comprise the UPC symbol is fed into a receive circuit 11. A timing oscillator 12 resolves the pulse transitions into increments of equal length and times the unloading of the receive circuit 11 into a pair of counters 13 and 14 which are also synchronized by the oscillator 12.

Counter 13 responds to the positive transitions of adjacent pulses and thus measures the elapsed time between positive pulse transitions. Counter 14 responds to negative transitions of adjacent pulses and thus may be similarly utilized to measure the time elapsed between such transitions. The outputs of counters 13 and 14 are fed through an OR gate 15 to a series of registers 16, 17, 18 arranged in a pushdown stack configuration 30.

Register 16 is designated as the Tx register, register 17 is designated as the Ty register, and register 18 is designated as the Tz register. Whenever a transition as sensed by the appropriate counter 13 or 14 occurs, the contents of that counter are loaded into the register stack. The respective counter is then reset and begins counting the respective transitions again. The three T registers 16, 17, and 18 store the transition information and provide to the remainder of the circuit all of the necessary information for decoding the bar code characters. The register stack is updated with every transition with the latest transition being fed to register 18, Tz.

As a result, the previously stored contents of register 18 are moved to the Ty register 17. The previous contents of Ty register 17 being fed to the Tx register 16 and the previous contents of register 16 is lost by being transferred out of the stack.

FIG. 2 shows a portion of a waveform derived from a typical UPC symbol including from left to right: a guard bar; digit 5; digit 0; . . . a center pattern; digit 7 . . . The contents of the stack 30 for each transition is shown thus: Tx1, Ty1 and Tz1; Tx2, Ty2, and Tz2; . . . Tx7, Ty7 and Tz7.

The contents of the Ty register 17 and the Tz register 18 are compared in an equal T circuit 19 to determine if two adjacent transition measurements in the two registers are equal within a certain predetermined tolerance. The occurrence of every such instance of equality of adjacent transition measurements as determined by the equal T circuit 19 causes a pulse to be applied to the equal T counter 20 which keeps a running count of such equal transitions. Whenever two adjacent transitions are not equal counter 20 is reset to zero.

A TR' circuit 21 has an input connected to each one of the registers 16, 17, and 18 and generates a count representative of the character length of the first character which will be denoted the character test length TR'. This test length will be based upon the two equal transitions of the starting code either a guard bar or a center bar. The test length, TR', will be stored in this circuit until the first character TR-1 appears in the register stack 30.

A TRN circuit 22 is fed from the outputs of registers 16 and 18 and functions to compare each new character length to determine if it is within a predetermined tolerance of the previous character length. The previous character length is stored in TRN circuit 22 while the new character length appears in the stack 30.

The output of the equal T circuit 19 is also fed to a guard bar detector circuit 23. The detector 23 checks for the existence of a guard bar at the completion of scanning. Such a guard bar consists of two equal transitions starting black, six characters after the center pattern.

A center bar detection circuit 24 receives an input from the counter 20 and determines that one field of the bar code has been decoded and alerts the unload control network 25 to accept the second field of the code.

Turning now to a fuller description of the operation of the system, the receive circuit 11 is adapted to receive a digitized pulse train which may represent a portion of or a complete bar code symbol. Every transition in the pulse train is detected by a pair of counters 13 and 14. Thus, counter 13 responds to positive to positive transitions while counter 14 responds to negative to negative transitions. Whenever the respective transitions occur, the counter is unloaded through an OR gate 15 into the register stack 30 at which point the counter is reset and begins to count again. The stack 30 comprises three registers in a push-down arrangement. Register 16 is fed from register 17 which in turn is fed from register 18. The most recently derived information from the counter 13 or 14 is held in register 18. Whenever the stacks of register 30 are fully occupied, the remainder of the system is able to look for particular pattern and to test for conditions which will enable it to determine whether a symbol is actually present, and if so, decode the symbol, or whether noise or other unwanted information has been received.

A bar code such as the UPC code has a guard bar at the beginning, a center bar in the middle, and a guard bar at the opposite end. The decoding system tests for the existence of either a guard bar or a center pattern which would be the starting pattern associated with a field of information. Immediately preceding the guard bar or the center bar is the character information. In particular, a starting pattern defined as a series of equal transitions is looked for. For example, the guard bar has two equal transitions, the first transition being white to black. A center pattern consists of a minimum of four equal transitions starting from white. The center pattern could additionally be surrounded by data fields on either side and could also contain five transitions starting with black, six, seven, eight or nine transitions. In each case, however, it is defined as a minimum as four equal transitions starting with white.

The equal T circuit 19 acts to measure two adjacent transitions which are within a fixed predetermined amount with respect to each other. If such transitions lie within the predetermined amount, the system will declare the transitions to be equal. The circuit 19 continuously compares the contents of register 17 and 18, that is the contents of the Ty and Tz registers. Every instance where the contents of registers 17 and 18 give rise to an equal condition as determined by the circuit 19 causes a pulse to be applied to the counter 20. The first time that the equal T circuit measures the requisite condition the counter 20 is set to "2". Counter 20 will then be updated by a single digit whenever equal transitions occur. If any is not equal, counter 20 will be reset to zero.

For example, a typical case would be the existence of two equal transitions with the first transition starting from white to black. This indicates that a guard bar has been sensed and that subsequently received data would contain character information in the sequence of white-black, white-black.

The UPC specification provides that the guard bar is composed of a black module, a white module, and a black module. A character is composed of seven modules in width with white-black, white-black transitions starting from the guard bar and the reverse starting from the center pattern. The white and black may be one to four modules in width but the total of the four data bits must add to seven. Accordingly, an indication of the possible existence of a character would be to measure its width from the start of a character to the end. The total width must add to seven modules.

Subsequently, every received character will be compared to the preceding character to ascertain that it is also within the test length measurements. Thus, the contents of Tx and Tz are added together in the TRN circuit 22 which operates as a character length tester.

During the next phase TR-2 will be compared to TR-1 for proper test lengths, TR-3 will be compared to TR-2 and so forth.

An adaptive sync generator 26, locates the position of the characters based on the fact that the characters are four data transitions apart. Thus, upon receipt of a guard bar the generator 26 will measure four transitions after the guard bar and conclude that the contents of the Tx, Ty, and Tz registers is a character. After the next four transitions, the sync generator will again decide that the contents of the stack 30 is in fact a new character.

The TR' circuit 21 generates a character test length for the first character. A starting code, i.e. a guard bar or center bar will give rise to two equal transitions. The TR' circuit 21 receives an input from each of the registers 16, 17 and 18. When the three registers 16, 17, and 18 are occupied with a character TR' circuit 21 generates a test length which is a predetermined value, for example $6\frac{1}{2}$ modules in width.

The character test length TR' is generated by circuit 21 sensing two equal transitions in the Ty and Tz registers 17 and 18. Since the contents of the Ty and Tz registers are each two modules in length, an adder circuit within circuit 21 combines the modules to form a four module length which is then added to $(\frac{1}{2})(Ty + Tz)$ and added again to $(\frac{1}{8})(Ty + Tz)$, through a series of adder and dividers within circuit 21 to generate a test length of exactly $6\frac{1}{2}$ modules long.

The TRN circuit which receives inputs from the Tz register 18 and the Tx register 16 compares the new character length with the test length generated by the TR' circuit 21. Thus the contents of Tx and Tz are summed together by circuit 22 and compared against the $6\frac{1}{2}$ module test length produced by the TR' circuit 21. If the character length Tx plus Tz is greater than the TR' test length then the system recognizes that the entire character may be stored in the stack 30 at that instant of time.

The module length data stored in the three registers of stack 30 is utilized by the successive approximation circuit 29 to decode a majority of the characters making up the UPC code. Circuit 29 has an input from each register Tx, Ty, Tz of stack 30.

A test length equal to $3\frac{1}{2}$ modules long is generated by adding the module lengths contained in registers Tx and Tz (which equals 7) and dividing by 2. From the nature of the UPC it is known that the contents of register Tx must have a value which is either 2, 3, 4, or 5 modules long. Similarly, the contents of registers Ty and Tz must each have a value of either 2, 3, 4, or 5 modules long.

The contents of either register Tx or Tz is selected and compared with the $3\frac{1}{2}$ module test length. The particular register chosen depends on which one contains a black to white transition. Then, if the tested register contents have a module length greater than $3\frac{1}{2}$, it can be concluded that the actual module length must be either 4 or 5. Conversely, if the tested register contents have a module length less than $3\frac{1}{2}$, the actual module length must be either 2 or 3.

Next, a 1-module test length is generated based on the summation of the contents of Tx and Tz and by appropriate division, similar to the method utilized to generate the TR' test length.

A further comparison is made between the contents of the tested register and the $3\frac{1}{2}$ and 1-module test lengths which are either summed or subtracted depending on the following cases.

If the tested register has a length greater than 3½, the 1-module and 3½-module test lengths are added thereby generating a test length of 4½-modules. Then, the tested register is compared to the 4½-module test lengths. If the register contents is greater than 4½ it is concluded that the character length is actually 5 modules. On the other hand, if the tested length is less than 4½-modules, the actual character length is 4-modules.

The 1-module test length is subtracted from the 3½-module test length thereby creating a 2½-module test length where the tested register contents are less than 3½-modules in length. Then the tested register is compared to the 2½-module test length. If greater than 2½ it is concluded that the character length is actually 3, while if less than 2½ it is concluded that the actual character length is 2-modules. THe contents of register Ty are then tested according to the same method, starting with the comparison to the 3½-module test length. In this way, the character length of the contents Ty is determined. Having determined the module length of Ty and either Tx or Tz, the remaining module length may be determined from the fact that Tx plus Tz must add up to 7 modules.

Following this procedure there are determined the digits 0 through 9 on the left side of the UPC symbol and digits 0 through 9 on the right side, a total of 20 cases. Twelve of the 20 cases are unique and are decoded without any uncertainty. However, there are four cases on each side where the digits have the same module counts giving rise to an uncertainty as to their true value. These digits are 1 and 7, and 2 and 8. Each pair generates exactly the same number of module lengths.

The uncertainty is resolved by means of the black to white ratio detector 38. By measuring the ratio of black and white bars the uncertainty between these pairs of characters is entirely eliminated. For instance, for the pair 1 or 7 left the digit is a 1 if white exceeds black while it is a 7 if black exceeds white. For the pair 1 or 7 right, if black exceeds white, it is a 1, while if white exceeds black, it is a 7. For the pair 2 or 8 left, if white exceeds black, it is a 2; if black exceeds white, it is an eight. For the pair of 2 or 8 right, if black exceeds white, it is a 2; if white exceeds black, it is an 8.

Accordingly, upon receipt of a guard bar, the system will measure four transitions later to test if TR-1 is greater than TR'. If greater, the character is decoded and sent to the character storage network 32 along with its parity.

If a center pattern is received consisting of four equal transitions starting with white, the system will measure four transitions later to see if TR-1 is greater than TR'. If so, the decoded character is treated as in the case of the guard bar condition immediately above. However, if TR-1 is less than TR' or, if TRN is not equal to TRN + 1 for the succeeding character, the system recognizes these conditions and causes a resynchronization. The adaptive sync generator 26 will shift an additional two transitions. At that point, if TR-1 is greater than TR' or, if TRN is equal to TRN + 1 the decoded character and its parity is fed into the character storage 32.

Under circumstances where a guard bar starting black is sensed, four transitions later TR' is compared with TR-1. If TR-1 is less than TR', the system will either reset by means of circuit 28 or resynchronize by means of the adaptive sync generator 26, according to the following conditions. If five or more equal transitions starting with black have been sensed, then resynchronization has occurred. If less than five equal transitions starting with black have been sensed then the reset circuit is reset, the equal T counter 20 is reset, and the system begins to look for two equal transitions. Then, TR' is generated and TR1 is compared with TR'.

A number of cases will illustrate the procedure more fully. In these cases, the term "A" synchronization refers to synchronization established upon the sensing of a guard bar. If the first character does not pass the length test then a guard bar cannot have been sensed. The system then looks for equal transitions, i.e. five or more equal transitions indicate the possible presence of a center pattern. If less than five such transitions are measured, resetting occurs since no center pattern was sensed. If more than five transitions are measured, a possible center pattern exists and the system continues checking by looking for characters.

Case 1: A guard has been sensed and TR1 is compared to TR'. If TR1 is less than TR' a decision is made to either reset or resynchronize. If the starting guard bar pattern is less than five equal transitions a resetting occurs. If the starting pattern is greater than five equal transitions a resynchronization takes place. Such resynchronization is termed "B" synchronization. During such "B" synchronization, if, at any time, TRN is not equal to TRN + 1, a further shifting results in what is termed "C" synchronization. The system looks for a center pattern. If no center pattern is seen, resetting occurs, if a center pattern is seen, then synchronization is shifted to "C" synchronization. This case is for the condition where the first character fails the length test.

Case 2: In this case the first character passed the length test. If TR1 is greater than TR' the system is in "A" synchronization. If TRN is not equal to TRN + 1 the system shifts to "B" synchronization. During "B" synchronization, if TRN is not equal to TRN + 1, there will be a resetting if no center pattern is sensed or a resynchronization if a center pattern is sensed.

Case 3: In this case the condition where a center pattern starting with a white to black transition ("B" synchronization) occurs. The length of the first character is disregarded in this condition. If TR1 is not greater than TR' or if TRN is not equal to TRN + 1 the system shifts to "C" synchronization.

In all of the above cases, at any time where the condition TR1 is greater than TR' or TRN is equal to TRN + 1 exists, the character and its parity is stored in the character storage network 32.

In a first case, the UPC symbol is sensed completely from guard bar to guard bar. The system locates the first guard bar, six characters and a center bar, the microprocessor 35 is notified that the symbol was decoded guard to center. Six more characters are then decoded followed by the guard bar thereby decoding the entire symbol.

In a second case, the UPC symbol is sensed from guard bar to center pattern. The guard bar is located, followed by six characters and the center pattern. One field has been decoded following which, the character test fails and the unload control 25 notifies the microprocessor 35 that decoding is completed.

In a third case, the UPC symbol is sensed from center pattern through the characters to guard bar. The unload control 25 notifies the microprocessor that decoding of the field is completed.

Under certain conditions, characters which have been stored in the character storage network 32 may have been decoded improperly or incorrectly. Such improper coding occurs where a shift of synchronization from B type to C type has occurred. Under these conditions, the memory location at the time of the synchronization shift is stored in the character storage network 32 and the microprocessor 35 is alerted that some characters have been incorrectly coded. Such incorrect decoding occurs where a zero or a three has occurred in the right field, or a four or six has occurred in the left field. Where this has occurred the zero is changed to a four, the three to a six on right and the four is corrected to a zero and the six is corrected to a three on left.

Accordingly, it is to be understood that many modifications and variations of the present invention will be obvious to those skilled in the art and, consequently, the scope of the invention is to be measured solely from the following claims.

What is claimed is:

1. A symbol decoding system for decoding symbols comprised of plurality of bars, some of which represent characters, comprising:
   means for providing a series of pulses representative of said bars;
   first counting means for counting the interval between negative-to-negative transistions between adjacent pulses in said series of pulses;
   second counting means for counting the interval between positive-to-positive transitions between adjacent pulses in said series of pulses;
   means coupled to said first and second counting means for storing data representing said counted intervals comprising register means arranged in push-down stack, said register means comprising:
   a first register for storing a first such transition interval;
   a second register for storing a second such transition interval; and
   a third register for storing a third such transition interval;
   each subsequently-received transition interval being applied to said register means, said register means thereupon causing the previously-stored contents of each of said registers to shift position in said stack;
   testing means coupled to said register means for testing for certain predetermined relationships among said counted intervals; and
   identifying means for identifying particular characters whenever said predetermined relationships are satisfied.

2. A symbol decoding system as set forth in claim 1, wherein:
   interval equality means are connected to said register means for determining a condition of equality between the intervals stored in said register means.

3. A symbol decoding system as set forth in claim 2, further including:
   character test length means connected to said register means for generating a test length interval representative of a first character.

4. A symbol decoding system as set forth in claim 3, further including:
   character length storage means connected to said register means for storing data representing the length of each subsequently-received character.

5. A symbol decoding system as set forth in claim 4, wherein:
   the contents of said character test length means is compared to the contents of said character length storage means.

6. A symbol decoding system as set forth in claim 5, further including:
   synchronization adjusting means connected to said character test length means and to said character length storage means for shifting the character location within said register means.

7. A symbol decoding system as set forth in claim 6, further including:
   character successive approximation means connected to said register means for determining the module length of a character stored in said register means.

8. A symbol decoding system as set forth in claim 7, further including:
   ratio testing means for identifying certain characters based on information contained in the bar symbols.

9. A symbol decoding system as set forth in claim 8, further including:
   unloading means for determining the sensing of at least a predetermined portion of a symbol.

* * * * *

UNITED STATES PATENT AND TRADEMARK OFFICE
CERTIFICATE OF CORRECTION

PATENT NO. : 4,075,461

DATED : February 21, 1978

INVENTOR(S) : Paul S. Wu and Robert V. Reago

It is certified that error appears in the above-identified patent and that said Letters Patent are hereby corrected as shown below:

Column 6, line 20, after "guard" insert --bar--.

Signed and Sealed this

Thirteenth Day of June 1978

[SEAL]

Attest:

RUTH C. MASON
*Attesting Officer*

DONALD W. BANNER
*Commissioner of Patents and Trademarks*